United States Patent
Kim et al.

(10) Patent No.: US 8,140,029 B2
(45) Date of Patent: *Mar. 20, 2012

(54) ADAPTIVE TRANSMISSION AND RECEIVING METHOD AND DEVICE IN WIRELESS COMMUNICATION SYSTEM WITH MULTIPLE ANTENNAS

(75) Inventors: Yun-Hee Kim, Daejeon (KR); Kwang-Soon Kim, Daejeon (KR); Sang-Hyun Lee, Busan (KR); Kyu-Jong Hwang, Daejeon (KR); Kyung-Hi Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/874,629

(22) Filed: Sep. 2, 2010

(65) Prior Publication Data

US 2011/0059700 A1 Mar. 10, 2011

Related U.S. Application Data

(63) Continuation of application No. 12/253,436, filed on Oct. 17, 2008, now Pat. No. Re. 42,098.

(30) Foreign Application Priority Data

Apr. 1, 2003 (KR) ........................ 10-2003-0020464

(51) Int. Cl.
*H04B 1/04* (2006.01)
*H04B 1/00* (2006.01)
*H04B 7/00* (2006.01)
*H04B 7/02* (2006.01)
*H04L 1/02* (2006.01)

(52) U.S. Cl. ............................ 455/103; 455/69; 375/267

(58) Field of Classification Search .................... 455/68, 455/69, 91, 101, 103, 127.1, 127.5, 130, 455/132, 272, 296, 452.1, 504, 562.1; 375/267, 375/295, 299, 337, 346, 347, 260; 370/203, 370/427
See application file for complete search history.

(56) References Cited

U.S. PATENT DOCUMENTS 6,922,560 B1 * 7/2005 Zhang ........................... 455/423
RE42,098 E * 2/2011 Kim et al. .................... 455/103

* cited by examiner

*Primary Examiner* — Eugene Yun (74) *Attorney, Agent, or Firm* — Kile Park Goekjian Reed & McManus PLLC (57) ABSTRACT

Disclosed is an adaptive transmit and receive method and device in a multiple-antenna wireless communication system. A transmit mode comprises different main transmit modes each of which includes one or both of a sub-transmit mode based on STBC and a sub-transmit mode based on SM. A receiver calculates an STBC performance parameter and a SM performance parameter, and a transmitter uses the parameters to determine a main transmit mode with maximum data rates and select a sub-transmit mode for minimizing power consumption. The transmitter channel-encodes, modulates and antenna-maps input data according to the selected transmit mode, and outputs results to the receiver. The receiver antenna/symbol-demodulates and channel-decodes the received data.

6 Claims, 6 Drawing Sheets

| Tx mode | | Code rate | Modulation | Antenna |
|---|---|---|---|---|
| Main Tx mode | Sub Tx mode | 330 | 340 | 350 |
| 0 | 0 | 1/6 | QPSK | STBC |
| 1 | 0 | 1/2 | QPSK | STBC |
| 2 | 0 | 1/2 | 16-QAM | STBC |
| 2 | 1 | 1/2 | QPSK | SM |
| 3 | 0 | 3/4 | 16-QAM | STBC |
| 3 | 1 | 3/4 | QPSK | SM |
| 4 | 0 | 2/3 | 64-QAM | STBC |
| 4 | 1 | 2/3 | 8-PSK | SM |
| 5 | 1 | 2/3 | 16-QAM | SM |

ADAPTIVE TRANSMISSION AND RECEIVING METHOD AND DEVICE IN WIRELESS COMMUNICATION SYSTEM WITH MULTIPLE ANTENNAS

CROSS REFERENCE TO RELATED APPLICATIONS

This application is a continuation of U.S. patent application Ser. No. 12/253,436, filed Oct. 17, 2008, the contents of which are incorporated by reference herein, which is a reissue application of U.S. patent application Ser. No. 10/723,528, filed Nov. 25, 2003 (now U.S. Pat. No. 7,123,887, issued Oct. 17, 2006), the contents of which are incorporated by reference herein, which claims priority to and the benefit of Korea Patent Application No. 2003-20464 filed on Apr. 1, 2003 in the Korean Intellectual Property Office, the content of which is incorporated herein by reference.

BACKGROUND OF THE INVENTION (a) Field of the Invention

The present invention relates to a wireless communication system with multiple antennas. More specifically, the present invention relates to an adaptive transmission and receiving method and device in a wireless communication system with multiple antennas.

(b) Description of the Related Art

The MIMO (multiple input multiple output) method, which is a transmission and receiving method using a plurality of antennas at a transmitter and a receiver, is one of the most noteworthy techniques in the wireless/mobile communication systems because of its performance improvement possibilities in increasing spectral efficiencies and diversity of transmission and reception.

One method for increasing data rates from among the transmission and receiving methods with multiple antennas is an SM (spatial multiplexing) method, in which a symbol sequence is divided into a plurality of sequences and transmitted to different transmit antennas. The symbols transmitted through the different antennas according to the SM method can be detected by using an OSIC (ordered successive interference canceller) receiver, a linear receiver based on ZF (zero forcing) or the MMSE (minimum mean square error) criterion, or an optimal ML (maximum likelihood) receiver.

Meanwhile, antenna diversity schemes are widely used to reduce a multi-path fading effect without increasing the data rates. In particular, the transmit diversity method by the Alamouti scheme in the case of two transmit antennas is widely applied to $3^{rd}$ generation mobile communication systems and broadband radio-access systems, because the transmit diversity method provides simple configurations of the transmitter and the receiver and enables acquisition of diversity of transmit and receive channels. The Alamouti antenna transmit method is an orthogonal STBC (space time block code) for two transmit antennas. However, an orthogonal code exists only when two transmit antennas are provided, and hence, pseudo orthogonal STBCs have been proposed for other numbers of transmit antennas. When such codes are applied in the frequency domain as in the OFDM (orthogonal frequency division multiplexing) transmission, they are called as SFBC (space frequency block code).

As described, since the SM method transmits a different symbol for each transmit antenna, its performance is substantially changed according to features of elements of an MIMO channel, but since the performance of an STBC method is determined not by each element of the MIMO channel but by the summation of the elements, the STBC method is less sensitive to the MIMO channel features, and hence, a desired antenna transmit method can be differentiated according to the channel environments.

A prior art for improving performance such as capacity and quality in the multiple antenna system is disclosed in U.S. Pat. No. 6,351,499 by lospan which varies a number of transmit antennas for SM according to characteristics of the MIMO channel. However, since the number of the transmit antennas is varied, functions of a receiver become complicated, and the prior art does not exploit the advantages of an STBC.

Together with this, an actively applied method for increasing the data throughput in the current state is the adaptive modulation coding method which selects a modulation order and a code rate suitable for desired performance according to an instantaneous state of fading and background noise intensity of a wireless channel, and transmits them variably, thereby increasing the data throughput. The above-noted adaptive modulation coding method is applied to the HSDPA and the 1xEV-DV which are evolved $3^{rd}$ generation mobile communication systems, and to the wireless LAN system and to the broadband radio access system, and it has been currently developed and commercialized.

However, selection references for channel state information and a modulation and coding method used by the conventional adaptive modulation coding methods are difficult to directly apply to wireless communication systems with multiple antennas that use spatial multiplexing, performance of which is greatly varied according to characteristics of the MIMO channel.

SUMMARY OF THE INVENTION

It is an advantage of the present invention to provide an adaptive transmission and receiving method and device in a wireless communication system with multiple antennas for adaptively modifying code rates, modulation methods, and antenna transmit methods according to channel environments.

In one aspect of the present invention, an adaptive transmit method of a transmitter in a wireless communication system with multiple antennas for transmitting data to a receiver with a plurality of receive antennas from the transmitter with a plurality of transmit antennas through an MIMO channel, comprises: (a) determining a channel coding method, a modulation method, and an antenna transmit method so as to support different data rates according to a characteristic of the MIMO channel, wherein the channel coding method, the modulation method, and the antenna transmit method are classified according to a main transmit mode for supporting different data rates, and the main transmit mode includes either or both of a sub-transmit mode based on the STBC and a sub-transmit mode based on the SM; (b) encoding input data according to the determined main transmit mode; (c) modulating the data encoded in (b) according to the determined sub-transmit mode, mapping them to modulation symbols, and outputting results; and (d) mapping the data modulated in (c) to symbol vectors to be transmitted through each transmit antenna according to the determined sub-transmit mode, and outputting results.

The characteristic of the MIMO channel is indicated by an antenna transmit performance parameter produced and fed back by the receiver.

The (a) comprises: determining a main transmit mode that provides the highest data rates from among the transmit modes (which includes the main transmit mode and the sub-transmit mode) that satisfy the performance required according to the characteristic of the MIMO channel, and determining a sub-transmit mode for reducing a transmit power from the determined main transmit mode.

The (d) comprises: performing antenna mapping based on STBC when performing symbol mapping having a first symbol constellation on the same main transmit mode in (c), and (d) comprises: performing antenna mapping based on SM when performing symbol mapping having a second symbol constellation on the same main transmit mode in (c).

The (a) comprises: (i) comparing an STBC performance parameter which is one of parameters for showing the characteristic of the MIMO channel with a previously stored STBC threshold value to select one of the main transmit modes having a sub-transmit mode based on the STBC; (ii) comparing an SM performance parameter which is one of parameters for showing the characteristic of the MIMO channel with a previously stored SM threshold value to select one of the main transmit modes having a sub-transmit mode based on the SM; and (iii) comparing the main transmit mode selected in (i) with the main transmit mode selected in (ii) to determine a final transmit mode (which includes a main transmit mode and a sub-transmit mode.

The (i) comprises: selecting a main transmit mode which has a minimum positive number obtained by subtracting the STBC threshold value from the STBC performance parameter, and (ii) comprises: selecting a main transmit mode which has a minimum positive number obtained by subtracting the SM threshold value from the SM performance parameter.

The main transmit mode has indices in the ascending order of data rates, and (iii) comprises: determining whether the main transmit mode selected in (i) is greater than the main transmit mode selected in (ii); determining the main transmit mode selected in (i) and a sub-transmit mode based on STBC of the selected main transmit mode as final transmit modes (which include a main transmit mode and a sub-transmit mode), when the main transmit mode selected in (i) is greater than the main transmit mode selected in (ii); and determining the main transmit mode selected in (i) and a sub-transmit mode based on STBC of the selected main transmit mode as final transmit modes (which include a main transmit mode and a sub-transmit mode), when the main transmit mode selected in (i) is matched with the main transmit mode selected in (ii), and the value obtained by subtracting the STBC threshold value from the STBC performance parameter is greater than the value obtained by subtracting the SM threshold value from the SM performance parameter.

The adaptive transmit method comprises: determining the main transmit mode selected in (ii) and a sub-transmit mode based on SM of the selected main transmit mode as final transmit modes (which include a main transmit mode and a sub-transmit mode), when the main transmit mode selected in (ii) is greater than the main transmit mode selected in (i); and determining the main transmit mode selected in (ii) and a sub-transmit mode based on SM of the selected main transmit mode as final transmit modes (which include a main transmit mode and a sub-transmit mode), when the main transmit mode selected in (i) is matched with the main transmit mode selected in (ii), and the value obtained by subtracting the SM threshold value from the SM performance parameter is greater than the value obtained by subtracting the STBC threshold value from the STBC performance parameter.

In another aspect of the present invention, an adaptive receive method of a receiver in a wireless communication system with multiple antennas for transmitting data to the receiver with a plurality of receive antennas from a transmitter with a plurality of transmit antennas through an MIMO channel, comprises: (a) extracting symbol information for each antenna from a signal received through the MIMO channel according to a channel coding method, a modulation method, and an antenna transmit method determined by the transmitter so as to support different data rates according to a characteristic of the MIMO channel, wherein the channel coding method, the modulation method, and the antenna transmit method are classified according to a main transmit mode for supporting different data rates, and the main transmit mode includes either or both of a sub-transmit mode based on the STBC and a sub-transmit mode based on the SM; (b) performing channel decoding according to the extracted symbol information for each transmit antenna, and estimating transmitted data information; and (c) extracting a parameter used by the transmitter for determining the channel coding method, the modulation method, and the antenna transmit method by using an MIMO channel response estimated from the signal received through the MIMO channel.

The (c) comprises: (i) calculating an STBC performance parameter which is one of parameters for showing characteristics of the MIMO channel by using the estimated MIMO channel response; and (ii) calculating a SM performance parameter which is one of parameters for showing the characteristics of the MIMO channel by using the estimated MIMO channel response.

The (i) comprises: calculating a channel power sum by using the estimated MIMO channel response; and calculating the STBC performance parameter by combining the calculated channel power sum with the estimated MIMO channel response.

The (i) comprises: calculating a linear equalization matrix by using the estimated MIMO channel response; calculating a transmit antenna post-processing SNR by using the calculated linear equalization matrix; and calculating the SM performance parameter by using the calculated transmit antenna post-processing SNR.

In still another aspect of the present invention, an adaptive transmit device in a wireless communication system with multiple antennas for transmitting data to a receiver with a plurality of receive antennas from a transmitter with a plurality of transmit antennas through an MIMO channel, comprises: an adaptive transmit controller for determining a channel coding method, a modulation method, and an antenna transmit method so as to support different data rates according to a characteristic of the MIMO channel, wherein the channel encoding method, the modulation method, and the antenna transmit method are classified according to a main transmit mode for supporting different data rates, and the main transmit mode includes either or both of a sub-transmit mode based on the STBC and a sub-transmit mode based on the SM; a channel encoder for encoding data input according to the channel encoding method determined by the adaptive transmit controller, and outputting results; a symbol mapper for modulating the data encoded by the channel encoder according to the modulation method determined by the adaptive transmit controller, mapping them to modulation symbols, and outputting results; and an antenna mapper for mapping the data modulated by the symbol mapper to symbol vectors to be transmitted through each transmit antenna according to the antenna transmit method determined by the adaptive transmit controller, and outputting results.

The symbol mapper comprises: a first symbol mapper for modulating the data output by the channel encoder to a first symbol constellation, and outputting results; and a second symbol mapper for modulating the data output by the channel encoder to a second symbol constellation, and outputting results, the antenna mapper comprises: a first antenna mapper for antenna-mapping the data modulated by the first symbol mapper according to the STBC method; and a second antenna mapper for antenna-mapping the data modulated by the second symbol mapper according to the SM method, and the adaptive transmit device further comprises: a demultiplexer for connecting the output of the channel encoder to one of the first and second symbol mappers according to the modulation method determined by the adaptive transmit controller; and a multiplexer for selecting one of the outputs of the first and second antenna mappers according to the antenna transmit method determined by the adaptive transmit controller.

The adaptive transmit controller comprises: an STBC threshold value lookup table for storing threshold values of STBC; an SM threshold value lookup table for storing threshold values of SM; an STBC transmit mode selector for comparing an STBC performance parameter fed back from the receiver with a threshold value stored in the STBC threshold value lookup table to select one of the main transmit modes; an SM transmit mode selector for comparing an SM performance parameter fed back from the receiver with a threshold value stored in the SM threshold value lookup table to select one of the main transmit modes; and a comparator for comparing the main transmit mode selected by the STBC transmit mode selector with the main transmit mode selected by the SM transmit mode selector to determine final transmit modes (which include a main transmit mode and a sub-transmit mode).

In still yet another aspect of the present invention, an adaptive receive device in a wireless communication system with multiple antennas for transmitting data to a receiver with a plurality of receive antennas from a transmitter with a plurality of transmit antennas through an MIMO channel, comprises: an antenna/symbol demodulator for extracting symbol information for each antenna from a signal received through the MIMO channel according to a channel coding method, a modulation method, and an antenna transmit method determined by the transmitter so as to support different data rates according to a characteristic of the MIMO channel, wherein the channel coding method, the modulation method, and the antenna transmit method are classified according to a main transmit mode for supporting different data rates, and the main transmit mode includes either or both of a sub-transmit mode based on the STBC and a sub-transmit mode based on the SM; a channel decoder for performing channel decoding according to the symbol information for each transmit antenna extracted by the antenna/symbol demodulator, estimating transmitted data information, and outputting results; a channel estimator for estimating an MIMO channel response from a signal received through the MIMO channel; and an adaptive transmit parameter extractor for extracting a parameter used by the transmitter for determining the channel coding method, the modulation method, and the antenna transmit method by using the MIMO channel response estimated by the channel estimator.

The adaptive transmit parameter extractor comprises: an STBC performance parameter calculator for calculating an STBC performance parameter by using an MIMO channel response estimated by the channel estimator; and an SM performance parameter calculator for calculating an SM performance parameter by using the MIMO channel response estimated by the channel estimator.

The STBC performance parameter calculator comprises: a channel power sum calculator for calculating a channel power sum by using the MIMO channel response estimated by the channel estimator; and a combiner for combining the channel power sum calculated by the channel power sum calculator with the MIMO channel response estimated by the channel estimator to calculate the STBC performance parameter.

The SM performance parameter calculator comprises: a linear equalizer for calculating a linear equalization matrix by using the MIMO channel response estimated by the channel estimator; an SM post-processing SNR calculator for calculating a transmit antenna post-processing SNR by using the linear equalization matrix calculated by the linear equalizer; and a representative calculator for calculating a representative of the SM performance parameter by using the transmit antenna post-processing SNR calculated by the SM post-processing SNR calculator.

The antenna/symbol demodulator performs orthogonal diversity combination by using the MIMO channel response estimated by the channel estimator to detect transmit symbols when the antenna transmit method determined by the transmitter is a space encoding method, and to detect the transmit symbols by using one of the ML detection method, the OSIC detection method, the MMSE linear equalization method, and the ZF linear equalization method when the antenna transmit method determined by the transmitter is a SM method.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention.

Accordingly, the drawings and description are to be regarded as illustrative in nature, and not restrictive.

An adaptive antenna transmit and receive device for a wireless communication system with multiple antennas according to a preferred embodiment of the present invention will be described referring to figures.

Figure 1:
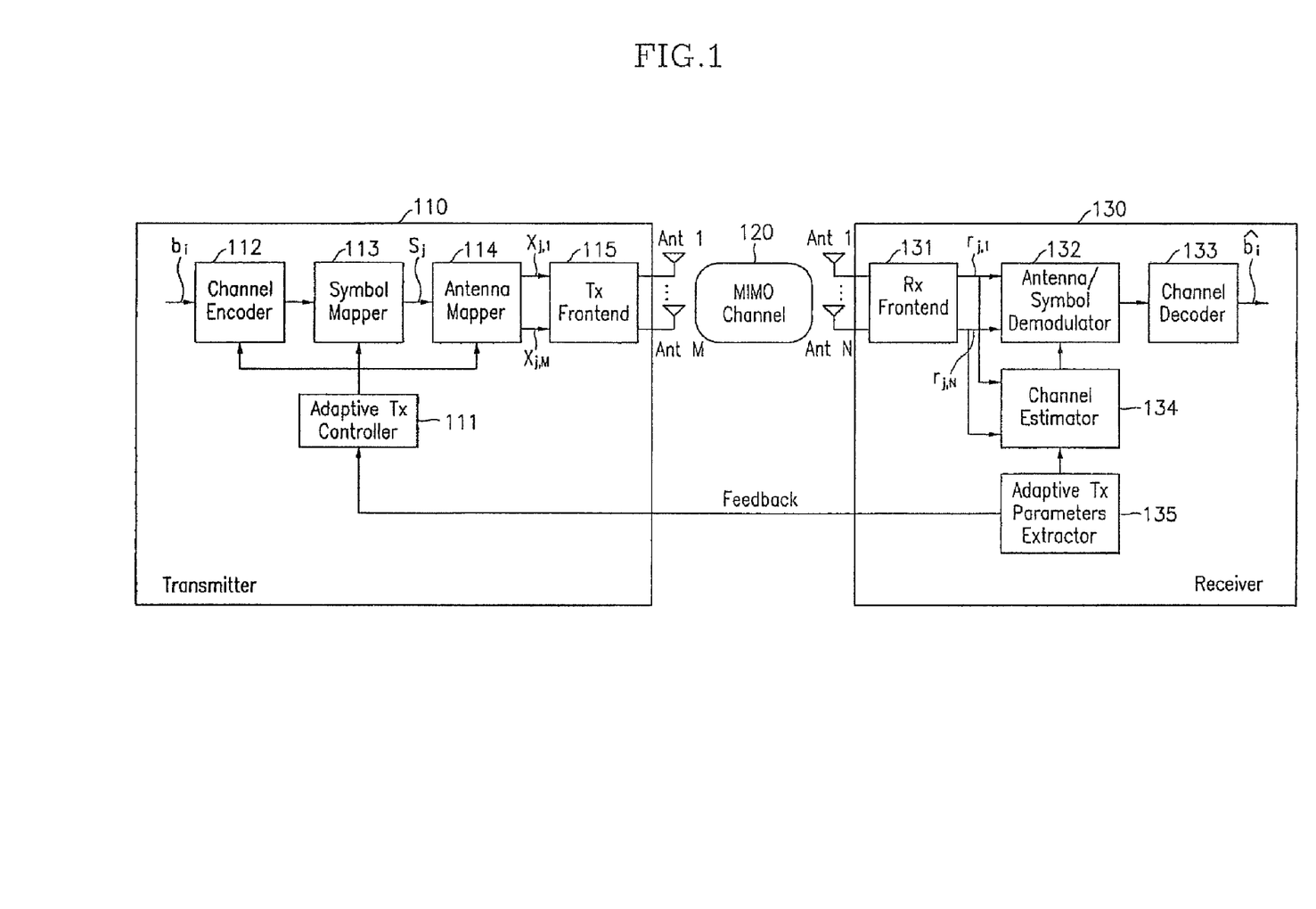
FIG. 1 shows a block diagram of an adaptive antenna transmit and receive device for a wireless communication system with multiple antennas according to a preferred embodiment of the present invention.

FIG. 1 shows a block diagram of an adaptive antenna transmit and receive device for a wireless communication system with multiple antennas according to a preferred embodiment of the present invention.

As shown in FIG. 1, the adaptive antenna transmit and receive device transmits and receives data through M transmit antennas and N receive antennas, and comprises a transmitter 110 for coding and modulating the data and transmitting processed data through an MIMO channel 120, and a receiver 130 for demodulating and decoding the data received through the MIMO channel 120 to restore the original data.

The transmitter 110 comprises an adaptive transmit controller 111, a channel encoder 112, a symbol mapper 113, an antenna mapper 114, and a transmit end 115.

First, the adaptive transmit controller 111 selects an encoding method of the channel encoder 112, a modulation method of the symbol mapper 113, and an antenna mapping method of the antenna mapper 114 according to a transmit mode selected by a signal fed back by the receiver 130.

The channel encoder 112 receives data $b_i$ to be transmitted, and encodes the same according to an encoding method selected by the adaptive transmit controller 111.

The symbol mapper 113 modulates the data encoded by the channel encoder 112 using a modulation method (e.g., QAM and PSK) selected by the adaptive transmit controller 111, maps them to modulation symbols $s_j$, and outputs result data.

The antenna mapper 114 receives outputs $s_j$ of the symbol mapper 113, maps the outputs $s_j$ to a symbol vector $x_j = (x_{j,1} \ldots x_{j,M})^T$ to be transmitted through each transmit antenna according to an antenna mapping method selected by the adaptive transmit controller 111, and outputs result data.

The transmit end 115 receives outputs $x_j = (x_{j,1} \ldots, x_{j,M})^T$ of the antenna mapper 114, configures signals according to a multi-carrier transmission method such as OFDM, or a single carrier transmission method and a multiple access method, and transmits the signals to the MIMO channel 120 that is an MIMO channel through the M transmit antennas.

Multiple-antenna transmit outputs at the transmit end 115 are provided to the receiver 130 with N receive antennas through the MIMO channel 120.

The receiver 130 comprises a receive end 131, an antenna/symbol demodulator 132, a channel decoder 133, a channel estimator 134, and an adaptive transmit parameter extractor 135.

First, the receive end 131 performs an inverse operation of the process of the transmitter 110 to extract signals $r_j = (r_{j,1} \ldots, r_{j,N})^T$ received through each receive antenna, and outputs them.

The antenna/symbol demodulator 132 acquires symbol information for each transmit antenna from the signals $r_j = (r_{j,1} \ldots, r_{j,N})^T$ output by the receive end 131 according to transmit mode information determined by the adaptive transmit controller 111.

The channel decoder 133 performs channel decoding according to the symbol information for each transmit antenna acquired by the antenna/symbol demodulator 132 to outputs result data $\hat{b}_i$ that are estimates of the transmitted data information $b_i$.

The channel estimator 134 receives the signals $r_j = (r_{j,1} \ldots, r_{j,N})^T$ output by the receive end 131, and estimates an MIMO channel response by using pilot symbols.

The antenna/symbol demodulator 132 performs orthogonal diversity combination by using the MIMO channel response estimated by the channel estimator 134 to detect transmit symbols when the antenna mapping method from among the transmit mode information determined by the adaptive transmit controller 111 of the transmitter 110 is a space encoding method, and to detect the transmit symbols by using one of the ML detection method, the OSIC detection method, the MMSE linear equalization method, and the ZF linear equalization method when the antenna mapping method is an SM method.

The adaptive transmit parameter extractor 135 finds parameters for the adaptive transmit by using channel estimation results output by the channel estimator 134, and transmits the parameters to the transmitter 110.

As a first example, outputs by the antenna mapper 114 following the STBC (or SFBC if it is applied in the frequency domain) method are given in Equation 1, and outputs by the antenna mapper 114 following the SM method are given in Equation 2 when the number M of the transmit antenna is 2.

$$x_j = (s_j, -s^*_{j+1})^T, \text{ for even } j$$

$$(s_j, s^*_{j-1})^T, \text{ for odd } j \qquad \text{Equation 1}$$

$$x_j = (s_{2j}, s_{2j+1})^T \qquad \text{Equation 2}$$

Figure 2:
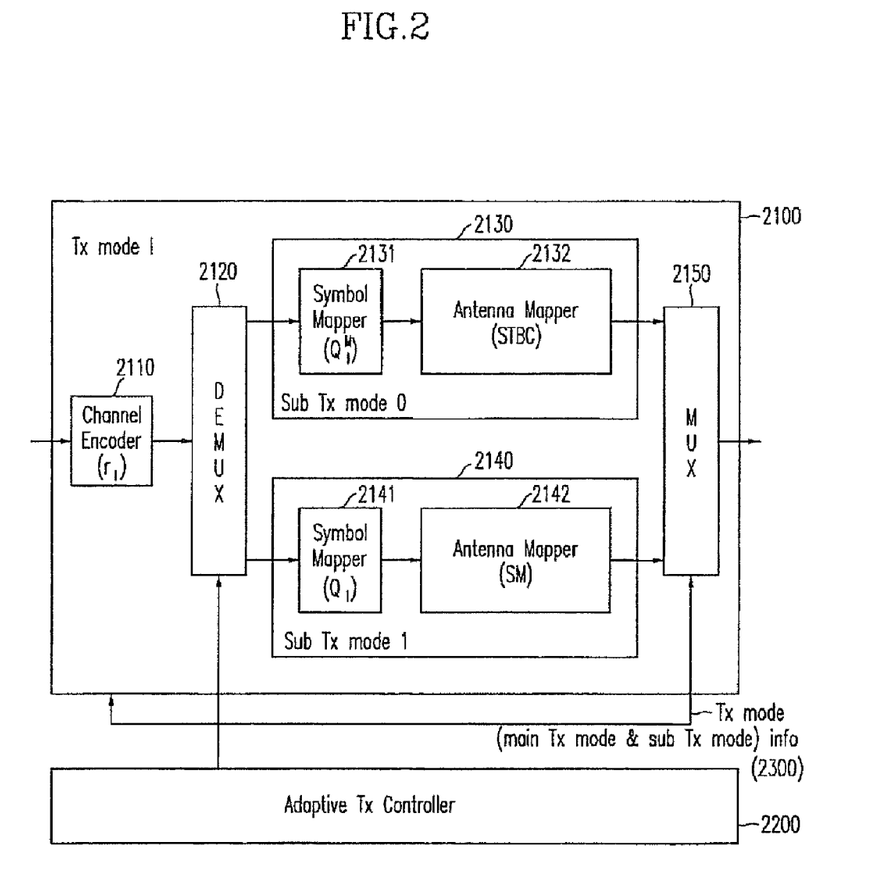
FIG. 2 shows a detailed block diagram of a transmitter of the adaptive antenna transmit and receive device for a wireless communication system with multiple antennas according to a preferred embodiment of the present invention.

FIG. 2 shows a detailed block diagram of a transmitter of the adaptive antenna transmit and receive device for a wireless communication system with multiple antennas according to a preferred embodiment of the present invention.

The transmit mode of the transmitter according to the preferred embodiment includes at least one main transmit mode for supporting other data rates, and the main transmit mode includes two maximum sub-transmit modes sharing the same channel encoding method.

As shown in FIG. 2, the transmitter of the adaptive antenna transmit and receive device comprises an adaptive transmit controller 2200 for determining information on the main transmit mode and the sub-transmit mode, and a transmit mode block 2100 for transmitting input data according to the data rate determined by the transmit mode (main transmit mode and sub-transmit mode) information output by the adaptive transmit controller 2200.

The transmit mode block 2100 comprises a channel encoder 2110 for encoding input data according to the channel code rate $r_I$ determined by the transmit mode information I output by the adaptive transmit controller 2200; a sub-transmit mode 0 block 2130 for performing symbol mapping and antenna mapping on the sub-transmit mode 0; a sub-transmit mode 1 block 2140 for performing symbol mapping and antenna mapping on the sub-transmit mode 1; a demultiplexer 2120 for connecting the channel encoder 2110 to one of the two sub-transmit mode blocks 2130 and 2140 according to sub-transmit mode information output by the adaptive transmit controller 2200; and a multiplexer 2150 for selecting one of the outputs of the two sub-transmit mode blocks 2130 and 2140 according to the sub-transmit mode information output by the adaptive transmit controller 2200.

In this instance, the sub-transmit mode 0 block 2130 comprises a symbol mapper 2131 having a modulation constellation $Q_I^M$, and an antenna mapper 2132 for space block coding, and sub-transmit mode 1 block 2140 comprises a symbol mapper 2141 having a modulation constellation $Q_I$, and an antenna mapper 2142 for SM.

The sub-transmit modes 0 and 1 at the above-configured transmitter support the same data rate $r_I M \log 2(Q_I)$, and one of the two sub-transmit modes is selected according to a characteristic of the MIMO channel.

The conventional adaptive transmit method supports a single transmit mode configured by a specific transmit antenna method for a single data rate, and the preferred embodiment uses a sub-transmit mode of using a different transmit antenna method to a main transmit mode of supporting the same data rates so as to maximize the data rates by applying an MIMO channel characteristic.

In the preferred embodiment, all of the main transmit modes have two sub-transmit modes, and for ease of realization, the case of supporting a single sub-transmit mode from among the two sub-transmit modes is also allowed.

Figure 3:
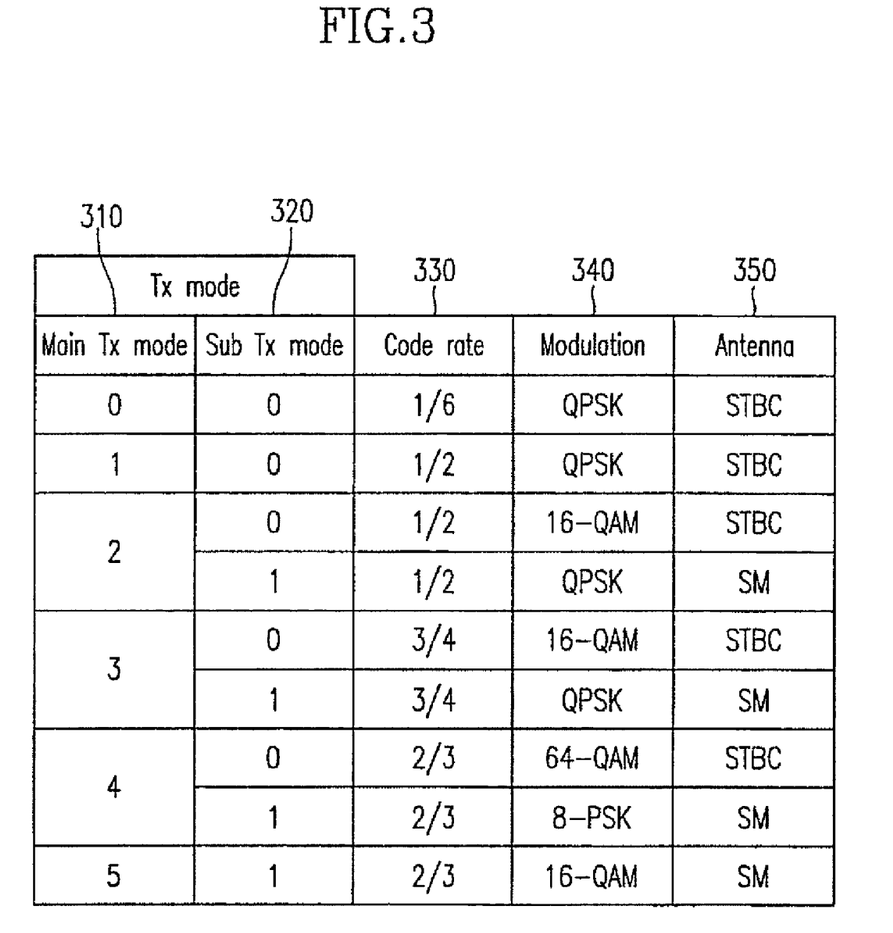
FIG. 3 shows an exemplified transmit mode supported by the transmitter of the adaptive antenna transmit and receive device for a wireless communication system with multiple antennas according to a preferred embodiment of the present invention.

FIG. 3 shows an exemplified transmit mode supported by the transmitter of the adaptive antenna transmit and receive device for a wireless communication system with multiple antennas according to a preferred embodiment of the present invention.

As shown in FIG. 3, the transmit mode has six main transmit modes that support different data rates when two transmit antennas are provided.

The main transmit modes 310 for supporting different data rates are numbered from 0 to 5, and there is at least one sub-transmit mode 320 that supports the respective main transmit modes 310, and it is assumed that a maximum of two sub-transmit modes are provided below.

Sub-transmit modes that support a single main transmit mode use the same channel code rates 330, but use a different modulation method 340 and transmit method 350. Part of the channel code rates 330, the modulation methods 340, and the antenna transmit methods 350 configuring different main transmit modes 310 may be the same, but corresponding data rates and performance are different.

Figure 4:
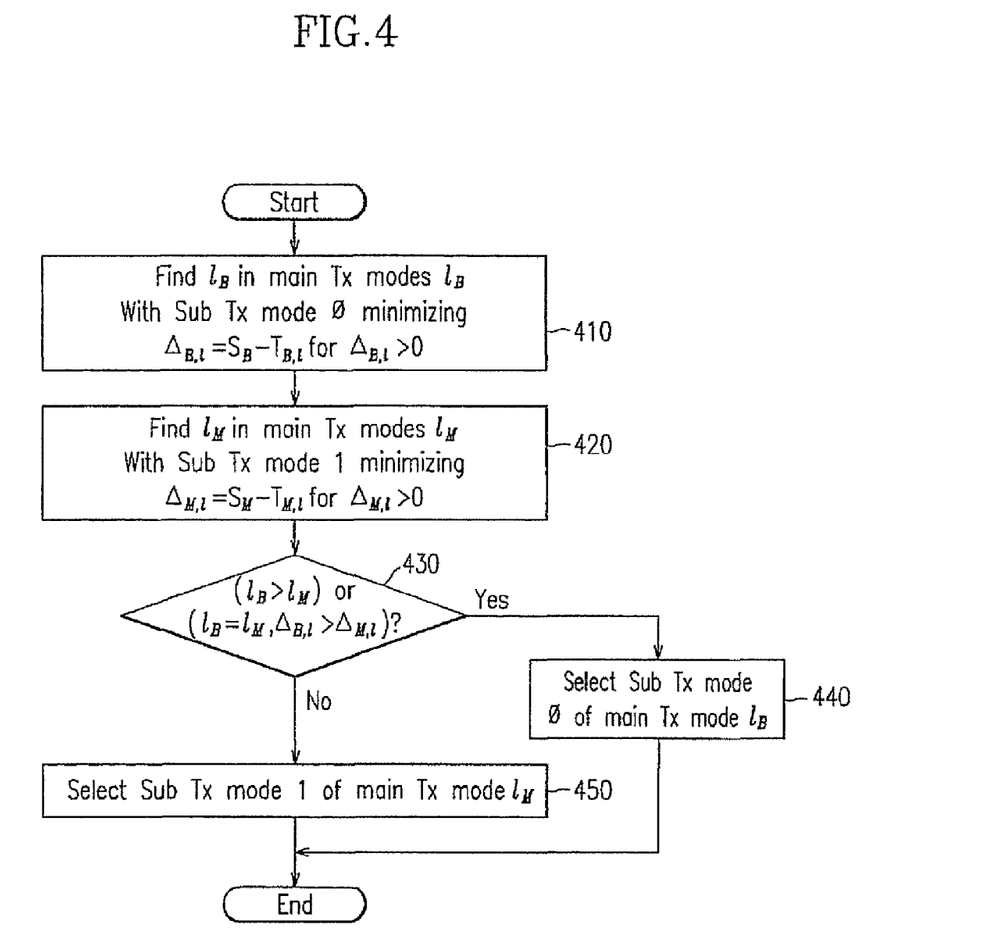
FIG. 4 shows a flowchart of a transmit mode selection method at the transmitter of the adaptive antenna transmit and receive device for a wireless communication system with multiple antennas according to a preferred embodiment of the present invention.

FIG. 4 shows a flowchart of a transmit mode selection method at the transmitter of the adaptive antenna transmit and receive device for a wireless communication system with multiple antennas according to a preferred embodiment of the present invention.

As shown in FIG. 4, the transmitter selects a main transmit mode that provides the highest data rates and reduces a transmit power from among the main transmit modes that satisfy the required performance according to the characteristic of the MIMO channel, and a sub-transmit mode, when the number of the transmit antennas is M and the number of the main transmit modes having indexes in the ascending order of the data rates is L.

First, a main transmit mode $I_B$ with the minimum difference $\Delta_{B,I} = S_B - T_{B,I}(\Delta_{B,I} > 0)$ between STBC performance parameters $S_B$ greater than a threshold value $T_{B,I}$ of the STBC mode and the threshold value $T_{B,I}$ is found in the main transmit modes having the sub-transmit mode 0 in step S10.

Next, a main transmit mode $I_M$ with the minimum difference $\Delta_{M,I} = S_M - T_{M,I}(\Delta_{M,I} > 0)$ between SM performance parameters $S_M$ greater than a threshold value $T_{M,I}$ of the SM mode and the threshold value $T_{M,I}$ is found in the main transmit modes having the sub-transmit mode 1 in step S20. In this instance, the order of the steps S10 and S20 can be exchanged or the steps S10 and S20 can be executed in parallel.

The steps S10 and S20 represent a process for finding the main transmit modes $I_B$ and $I_M$ that support the maximum data rates for satisfying the required performance for the respective two sub-transmit modes in the main transmit modes supported by the respective sub-transmit modes.

Next, it is determined whether the transmit modes $I_B$ and $I_M$ found through the steps S10 and S20 satisfy that $I_B > I_M$ or satisfy that $I = I_B = I_M$ and $\Delta_{B,I} > \Delta_{M,I}$ in step S30.

If $I_B > I_M$ or if $I = I_B = I_M$ and $\Delta_{B,I} > \Delta_{M,I}$, the sub-transmit mode 0 of the main transmit mode $I_B$ is selected in step S40, or else the sub-transmit mode 1 of the main transmit mode $I_M$ is selected in step S50.

In the step S30, a main transmit mode for supporting high data rates from among the data rates supported according to sub-transmit modes, that is, a value having a large main transmit mode index is initially selected, and when the data rates respectively supported by the sub-transmit modes are the same, a mode for requiring less transmit power, that is, a sub-transmit mode for further decreasing the transmit power, is selected.

When the number of the transmit antennas is M according to the preferred embodiment, the STBC performance parameter $S_B$ is given as Equation 3.

$$S_B = 10\log_{10}(SNR_{SBC}) = 10\log_{10}\left(\frac{\|H\|^2}{M}\frac{E_s}{N_0}\right) \quad \text{Equation 3}$$

where $\|H\|^2 = \sum_{p=1}^{N}\sum_{q=1}^{M}\|h_{p,q}\|^2$, $$H = \begin{bmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{N,1} & h_{N,2} & \cdots & h_{N,M} \end{bmatrix}$$

is an MIMO channel response, $E_S$ is a transmit symbol energy, and $N_0$ is the variance of complex additive white noise.

Meanwhile, the SM performance parameter $S_M$ can be given as Equation 4 for having the minimum value of the post-processing SNR as a reference or Equation 5 for having the geometric mean of the post-processing SNR as a reference.

$$S_M = \min_q 10\log_{10}(SNR_{SM,q}) \quad \text{Equation 4}$$

$$S_M = \frac{1}{M}\sum_{q=1}^{M} 10\log_{10}(SNR_{SM,q}) \quad \text{Equation 5}$$

From Equations 4 and 5, $SNR_{SM,q}$ is a post-processing SNR of the symbol transmitted to the q-th transmit antenna, Equation 4 is found based on the fact that the performance before a channel decoding depends on the minimum SNR, and Equation 5 is for introducing a performance improvement caused by a well-performed symbol after the channel decoding, and hence, usage of Equation 5 generates improved performance after channel decoding.

Equation 6 shows an SM post-processing SNR calculated based on a linear reception is processed, when the number of the transmit antennas is M.

$$SNR_{SM,q} = \frac{E_S g_q^H h_q}{MN_0 + E_S \sum_{j \neq q} g_q^H h_j} \quad \text{Equation 6}$$

where $h_q$ is the q-th column vector of H, and $g_q$ is the q-th column vector of the linear equalization matrix G.

The linear equalization matrix G is differentiated according to the linear equalization criterion, and it uses Equation 7 when using the ZF criterion, and it uses Equation 8 when using the MMSE criterion.

$$G = (H^H H)^{-1} H^H \quad \text{Equation 7}$$

$$G = \left(H^H H + \frac{N_0}{ME_S} I_M\right)^{-1} H^H \quad \text{Equation 8}$$

After this process, the SNR can be used in any case when the receiver uses any method for the antenna/symbol demodulator on the SM. The threshold value and $T_{M,I}$ and $T_I$ for determining the transmit mode are modified according to the antenna/symbol demodulation method and the SM post-processing SNR calculation method.

Equation 9 shows the SNR after processing the SM method calculated based on the ZF criterion when the number of the transmit antennas is 2, and the number N of the receive antennas is greater than 2. From Equation 9, Equation 4 can be given as Equation 10, and Equation 5 can be given as Equation 11.

$$SNR_{SM,q} = \frac{1}{2(H^H H)_{qq}^{-1}} \frac{E_S}{N_0} = \alpha_q(1-\rho^2)SNR_{SBC} \quad \text{Equation 9}$$

where $A_{qq}^{-1}$ is the (q,q)-th element of $A^{-1}$, $$\alpha_q = \frac{\|h_q\|^2}{\|H\|^2}$$

is a channel power ratio of the q-th transmit antenna, $$\rho = \frac{\|h_1^H h_2\|}{\|h_1\|\|h_2\|}$$

is a channel correlation between two transmit antennas, and $\|v\|$ is a norm of v.

$$S_M = 10\log_{10}(\alpha_{min}(1-\rho^2)) + S_B \quad \text{Equation 10}$$

where $\alpha_{min} = \min_q \alpha_q$.

$$S_M = 10\log_{10}(\sqrt{\alpha_1 \alpha_2}(1-\rho^2)) + S_B \quad \text{Equation 11}$$

where $\alpha_1$ and $\alpha_2$ are channel power ratio for each transmit antenna, and $\rho$ is a channel correlation of the transmit antenna.

Therefore, the channel power ratio for each channel transmit antenna can be calculated from the MIMO channel, and $(S_B - S_M)$ can be calculated from the channel correlation of the transmit antenna instead of directly calculating the SM performance parameter $S_M$.

Figure 5:
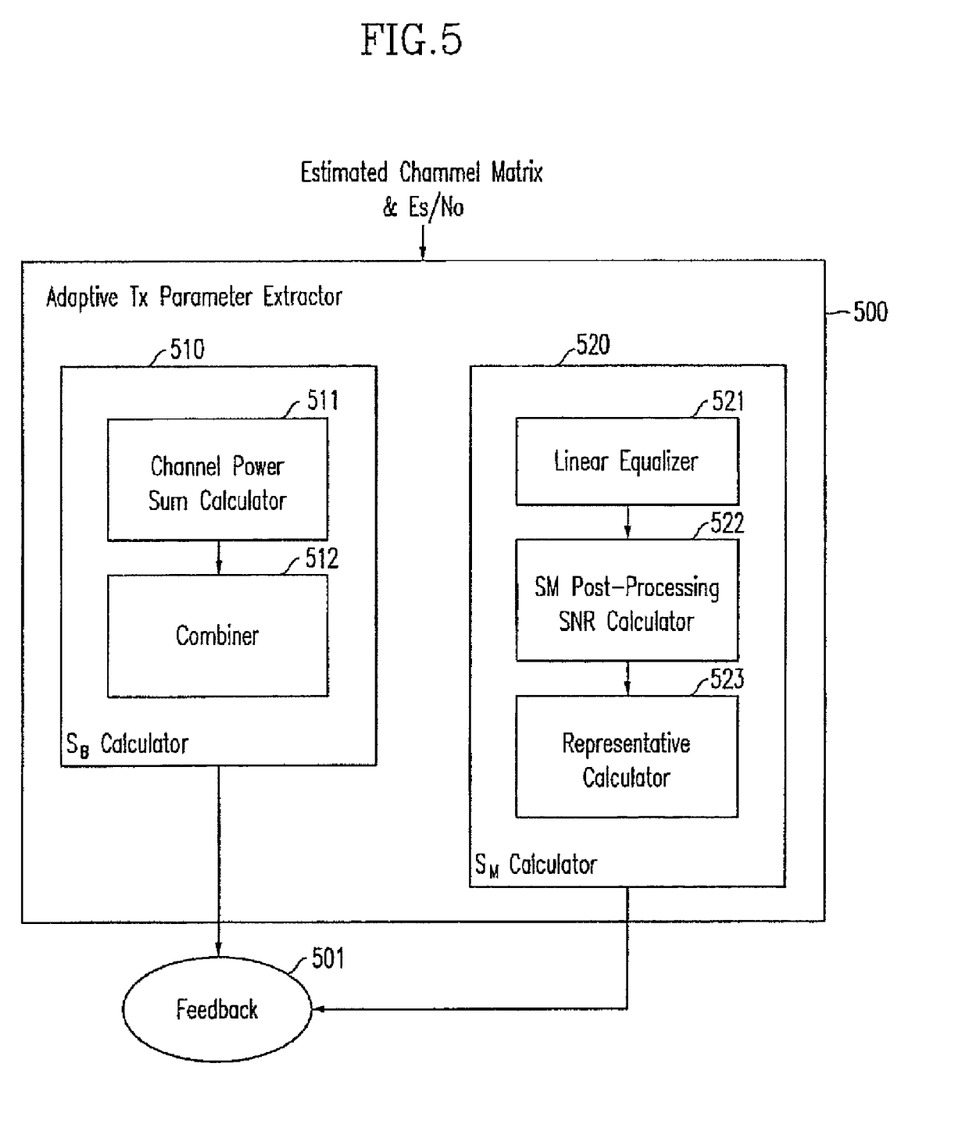
FIG. 5 shows a detailed block diagram of an adaptive transmit parameter extractor at a receiver of the adaptive antenna transmit and receive device for a wireless communication system with multiple antennas according to a preferred embodiment of the present invention.

FIG. 5 shows a detailed block diagram of an adaptive transmit parameter extractor at the receiver of the adaptive antenna transmit and receive device for a wireless communication system with multiple antennas according to a preferred embodiment of the present invention.

As shown in FIG. 5, the adaptive transmit parameter extractor 500 comprises an $S_B$ calculator 510 and an $S_M$ calculator 520, and respectively calculates the STBC performance parameter $S_B$ and the SM performance parameter $S_M$ by using a channel response matrix estimate H and a receive SNR estimate $E_S/N_0$ input by the channel estimator.

The $S_B$ calculator 510 comprises a channel power sum calculator 511 and a combiner 512, and the channel power sum calculator 511 calculates the channel power sum $\|H\|^2$ by using a channel response matrix estimate input by the channel estimator.

The combiner 512 calculates the STBC performance parameter $S_B$ following Equation 3 by combining the channel power sum calculated by the channel power sum calculator 511 and the receive SNR estimate $E_S/N_0$ input by the channel estimator.

The $S_M$ calculator 520 comprises a linear equalizer 521, an SM post-processing SNR calculator 522, and a representative calculator 523. The linear equalizer 521 calculates the equalization matrix G shown as Equation 7 or 8 on the basis of the ZF or MMSE criterion.

The SM post-processing SNR calculator 522 calculates a transmit antenna post-processing SNR based on Equation 6 by using the equalization matrix G calculated by the linear equalizer 521.

The representative calculator 523 calculates a representative of the SM performance parameters $S_M$ according to Equation 4 or 5 by using the transmit antenna post-processing SNR calculated by the SM post-processing SNR calculator 522.

The $S_B$ calculated by the $S_B$ calculator 510 and the $S_M$ calculated by the $S_M$ calculator 520 are quantized, or they are converted to $S_B$ and $(S_B - S_M)$ and quantized, and fed back (501) to the transmitter so that the adaptive transmit controller of the transmitter may use them to select a transmit mode.

Figure 6:
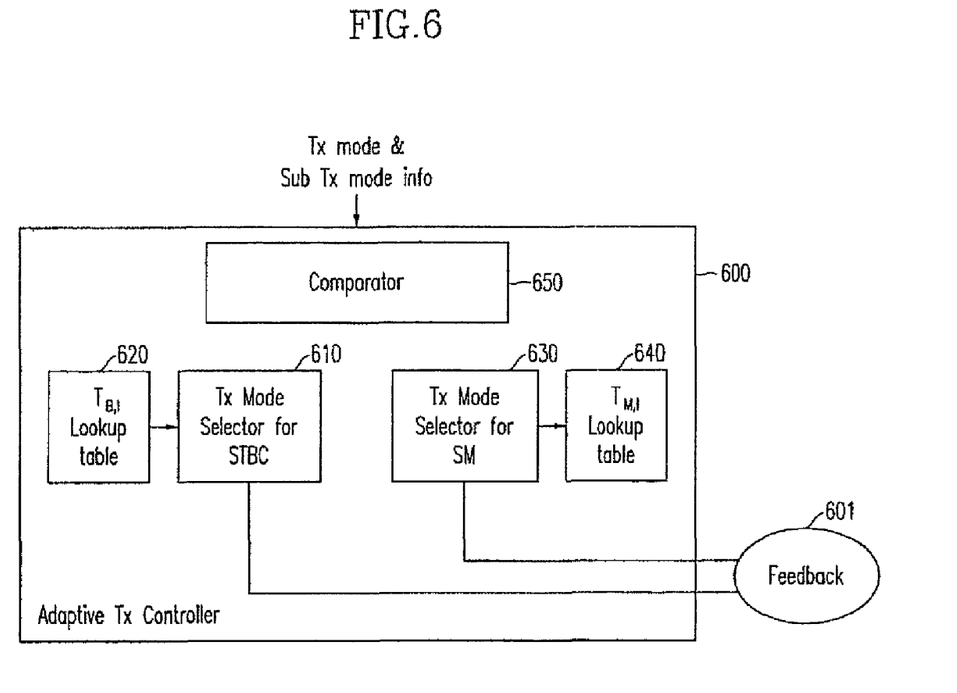
FIG. 6 shows a detailed block diagram of an adaptive transmit controller of the adaptive antenna transmit and receive device for a wireless communication system with multiple antennas according to a preferred embodiment of the present invention.

FIG. 6 shows a detailed block diagram of an adaptive transmit controller 600 of the adaptive antenna transmit and receive device for a wireless communication system with multiple antennas according to a preferred embodiment of the present invention.

As shown in FIG. 6, the adaptive transmit controller 600 comprises a STBC transmit mode selector 610, a $T_{B,I}$ lookup table 620, an SM transmit mode selector 630, a $T_{M,I}$ lookup table 640, and a comparator 650.

The STBC transmit mode selector 610 compares the STBC performance parameter $S_B$ fed back (601) from the receiver with $T_{B,I}$ values of the $T_{B,I}$ lookup table 620 to calculate $\Delta_{B,I} = S_B - T_{B,I}$ as shown in the step S10 of FIG. 4, and outputs a main transmit mode value $I_B$ which is a positive number and has the minimum value, and a corresponding $\Delta_{B,I}$.

The SM transmit mode selector 630 compares the SM performance parameter $S_M$ fed back (601) from the receiver with $T_{M,I}$ values of the $T_{M,I}$ lookup table 640 to calculate $\Delta_{M,I} = S_M - T_{M,I}$ as shown in the step S20 of FIG. 4, and outputs a main transmit mode value $I_M$ which is a positive number and has the minimum value, and a corresponding $\Delta_{M,I}$.

The comparator 650 selects the sub-transmit mode 0 of the main transmit mode $I_B$ when $I_B > I_M$, and selects the sub-transmit mode 1 of the main transmit mode $I_M$ when $I_B < I_M$, as shown in the step S30 of FIG. 4.

In addition, in the case that $I = I_B = I_M$, the comparator 650 selects the sub-transmit mode 0 of the main transmit mode I when $\Delta_{B,I} > \Delta_{M,I}$, and selects the sub-transmit mode 1 if not, thereby outputting finally selected transmit mode and sub-transmit mode information.

According to the present invention, the main transmit mode for transmitting specific data rates using the adaptive transmit method is configured with the transmit and receive method based on the SM antenna transmit method and the transmit and receive method based on the STBC antenna transmit method so as to adaptively select a desired method depending on the MIMO channel environment in the wireless communication system with multiple antennas, thereby more effectively handling the MIMO channel environment to further increase the data rates in the given transmit power, and reduce transmit power consumption in the given data rates.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An adaptive communication method of a receiver for receiving data from a transmitter through a wireless channel in wireless communication system, comprising:
   receiving a signal from the transmitter through the wireless channel;
   estimating characteristics of the wireless channel using the signal received from the transmitter;
   generating a feedback signal including an information to support determination of whether or not to use transmit diversity mode as a transmit mode based on the feedback signal, and an information including channel coding method and modulation method; and
   transmitting the feedback signal to the transmitter through the wireless channel.

2. The method of claim 1, further comprising:
   extracting symbol information for each transmit antenna from the signal received from the wireless channel,
   wherein the estimating characteristics of the wireless channel estimates the characteristics of the wireless channel based on the symbol information.

3. The method of claim 1, wherein the feedback signal includes an information to support determination of a transmit mode between transmit diversity mode and SM (Spatial Multiplexing) mode.

4. An adaptive communication device for receiving data from a transmitter through a wireless channel in a wireless communication system, comprising:
   a receiver for receiving a signal from the transmitter through the wireless channel;
   a channel estimator for estimating a characteristics of the wireless channel using the signal received from the transmitter;
   an adaptive transmission parameter extractor for extracting a parameter including an information to support determination of whether or not to use transmit diversity mode as a transmit mode and an information including channel coding method and modulation method; and
   a transmitter for transmitting the extracted parameter to the transmitter through the wireless channel.

5. The device of claim 4, further comprising:
   an antenna/symbol demodulator for extracting symbol information for each transmit antenna from the signal received through the wireless channel;
   wherein the channel estimator estimates characteristics of the wireless channel based on the symbol information.

6. The device of claim 4, wherein the parameter includes an information to support determination of a transmit mode between transmit diversity mode and SM (Spatial Multiplexing) mode.

* * * * *